United States Patent
Abe et al.

(10) Patent No.: US 11,651,893 B2
(45) Date of Patent: May 16, 2023

(54) METHOD OF PREPARING MOLDS FOR POLAR ANISOTROPIC RING-SHAPED BONDED MAGNET MOLDED ARTICLES

(71) Applicant: NICHIA CORPORATION, Anan (JP)

(72) Inventors: Masahiro Abe, Tokushima (JP); Kohei Ihara, Tokushima (JP)

(73) Assignee: NICHIA CORPORATION, Anan (JP)

( * ) Notice: Subject to any disclaimer, the term of this patent is extended or adjusted under 35 U.S.C. 154(b) by 681 days.

(21) Appl. No.: 16/584,887

(22) Filed: Sep. 26, 2019

(65) Prior Publication Data

US 2020/0105466 A1 Apr. 2, 2020

(30) Foreign Application Priority Data

Sep. 27, 2018 (JP) .............................. JP2018-182075
Sep. 5, 2019 (JP) .............................. JP2019-162122

(51) Int. Cl.
| | | |
|---|---|---|
| *H01F 41/02* | (2006.01) | |
| *H01F 1/057* | (2006.01) | |
| *B29C 45/26* | (2006.01) | |

(52) U.S. Cl.
CPC .......... *H01F 41/028* (2013.01); *B29C 45/26* (2013.01); *H01F 1/0577* (2013.01)

(58) Field of Classification Search
CPC .... H01F 41/028; H01F 1/0577; H01F 1/0558; H01F 1/0578; H01F 1/0555; H01F 1/0533; H01F 1/03; H01F 27/24; B29C 45/26; B22F 1/00
See application file for complete search history.

(56) References Cited

U.S. PATENT DOCUMENTS

| | | | | |
|---|---|---|---|---|
| 4,734,253 A | * | 3/1988 | Sato ...................... | H01F 1/0577 148/108 |
| 4,990,306 A | | 2/1991 | Ohashi | |
| 2005/0034788 A1 | * | 2/2005 | Kim ...................... | H01F 41/028 148/104 |
| 2005/0076973 A1 | * | 4/2005 | Masuzawa ............ | H01F 7/0268 148/108 |

FOREIGN PATENT DOCUMENTS

| | | |
|---|---|---|
| JP | H02-139907 A | 5/1990 |
| JP | 2006-011312 A | 1/2006 |
| JP | 2006-142678 A | 6/2006 |

* cited by examiner

*Primary Examiner* — Galen H Hauth
*Assistant Examiner* — Shibin Liang
(74) *Attorney, Agent, or Firm* — Hunton Andrews Kurth LLP

(57) ABSTRACT

Provided are molds for polar anisotropic ring-shaped bonded magnet molded articles which enable the production of bonded magnet molded articles with a high degree of roundness and only slight distortion, without the need for mold modification and preparation of a test mold, and a method of preparing such molds. The present invention relates to a method of preparing a mold for a polar anisotropic ring-shaped bonded magnet molded article, the method including: 1) determining the shrinkage length (Tc) of a desired polar anisotropic ring-shaped bonded magnet molded article using the following equation: $Tc = T \times (\alpha 1/100 - \alpha 2/100)$; 2) determining the radius (Dm) of a magnetic pole portion of a mold cavity using the following equation: $Dm = D/(1 - \alpha 2/100)$; and 3) defining the outer peripheral shape of the mold cavity from the Tc, the Dm, and the number (P) of magnetic poles of the molded article.

10 Claims, 2 Drawing Sheets

Magnetic field direction

METHOD OF PREPARING MOLDS FOR POLAR ANISOTROPIC RING-SHAPED BONDED MAGNET MOLDED ARTICLES

CROSS-REFERENCE TO RELATED PATENT APPLICATION

This application claims priority to Japanese Patent Application No. 2018-182075 filed on Sep. 27, 2018 and Japanese Patent Application No. 2019-162122 filed on Sep. 5, 2019. The disclosures of Japanese Patent Application No. 2018-182075 and Japanese Patent Application No. 2019-162122 are hereby incorporated by reference in their entireties.

BACKGROUND

Technical Field

The present invention relates to a method of preparing molds for polar anisotropic ring-shaped bonded magnet molded articles.

Description of Related Art

In the production of a polar anisotropic ring-shaped bonded magnet molded article by injection molding of a bonded magnet composition, when the melted bonded magnet composition is injected into and solidified in the mold, its volume shrinks. The degree of volume shrinkage depends on the amount of the thermoplastic resin present in the composition, which shrinks to a greater extent with changes in temperature. Further, since the bonded magnet composition contains a magnetic powder, anisotropic shrinkage is caused by the magnetic field, so that the molded article is distorted and it is impossible to produce a molded article to which the shape of the mold is transferred as it is. Therefore, it has been conventional to produce a bonded magnetic molded article to measure the degree of distortion, and then have an expert modify the mold to produce a molded article with a perfect circle shape.

Moreover, JP 2006-11312 A discloses a method of producing elongated magnet molded articles by compression molding in a magnet field. The method includes filling a mold with a magnet compound and applying external force to each portion of the magnet compound such that the plunge depth of each portion of the magnet compound is adjusted to an equal distance to increase the packing density of the magnet compound. However, this method is for producing elongated magnet molded articles and cannot be applied to molds for polar anisotropic ring-shaped bonded magnet molded articles.

Moreover, JP 2006-142678 A discloses a method that includes preparing a test resin molded specimen using a test mold for molding resin prepared by resin flow analysis and preparing a mold based on the measured dimensions. However, this method requires the preparation of a test mold in advance.

SUMMARY

The present invention aims to provide molds for polar anisotropic ring-shaped bonded magnet molded articles which enable the production of bonded magnet molded articles having a high degree of roundness with only slight distortion, without the need for mold modification and preparation of a test mold, and a method of preparing such molds.

The present inventors conducted various studies on molds for polar anisotropic ring-shaped bonded magnet molded articles. As a result, it has been found that molds for bonded magnet molded articles whose mold cavity has an outer peripheral shape defined using the shrinkage length of the molded article, the radius of the magnetic pole portion, and the number of magnetic poles of the molded article, enable the production of molded articles with a high degree of roundness, without the need for mold modification and preparation of a test mold in advance. This finding has led to the completion of the present invention.

Specifically, the present invention relates to a method of preparing a mold for a polar anisotropic ring-shaped bonded magnet molded article, the method including:

1) determining a shrinkage length (Tc) of a desired polar anisotropic ring-shaped bonded magnet molded article using the following equation:

$$Tc = T \times (\alpha 1/100 - \alpha 2/100)$$

wherein $\alpha 1$ represents a shrinkage ratio of a molded specimen in a direction vertical to a magnetic field, $\alpha 2$ represents a shrinkage ratio of the molded specimen in a direction parallel to the magnetic field, and T represents a wall thickness of the molded article;

2) determining a radius (Dm) of a magnetic pole portion of a mold cavity using the following equation:

$$Dm = D/(1 - \alpha 2/100)$$

wherein $\alpha 2$ represents the shrinkage ratio, and D represents an outer radius of the molded article; and 3) defining an outer peripheral shape of the mold cavity using the Tc, the Dm, and a number (P) of magnetic poles of the molded article.

The preparation method of the present invention provides molds for polar anisotropic ring-shaped bonded magnet molded articles which enable the production of bonded magnet molded articles with a high degree of roundness, without the need for mold modification and preparation of a test mold.

DETAILED DESCRIPTION

Embodiments of the present invention are described in detail below. The following embodiments, however, are intended as examples to embody the technical idea of the present invention and are not intended to limit the scope of the present invention to the following embodiments. As used herein, the term "step" encompasses not only an independent step but also a step that may not be clearly distinguished from other steps, as long as a desired object of the step is achieved.

A method of preparing a mold for a polar anisotropic ring-shaped bonded magnet molded article of a present embodiment includes:

1) determining the shrinkage length (Tc) of a desired polar anisotropic ring-shaped bonded magnet molded article using the following equation:

$$Tc = T \times (\alpha 1/100 - \alpha 2/100)$$

wherein $\alpha 1$ represents the shrinkage ratio of a molded specimen in a direction vertical to a magnetic field, $\alpha 2$ represents the shrinkage ratio of the molded specimen in a direction parallel to the magnetic field, and T represents the wall thickness of the molded article;

2) determining the radius (Dm) of the magnetic pole portion of a mold cavity using the following equation:

$$Dm = D/(1 - \alpha 2/100)$$

wherein $\alpha 2$ represents the shrinkage ratio, and D represents the outer radius of the molded article; and 3) defining the outer peripheral shape of the mold cavity using the Tc, the Dm, and the number (P) of magnetic poles of the molded article.

Figure 1:
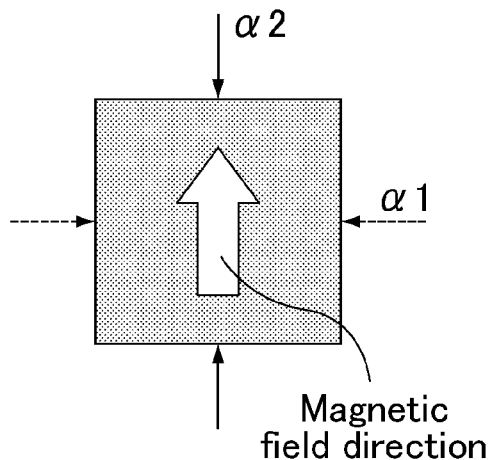
FIG. 1 is a conceptual diagram that shows the directions along which a bonded magnet molded article shrinks in a magnetic field.

FIG. 1 is a conceptual diagram that shows shrinkage with respect to the magnetic field direction. In the absence of a magnetic field, shrinkage occurs equally in both vertical and horizontal directions, while in the presence of a magnetic field, the magnetic field-induced shrinkage is greater in a direction vertical to the magnetic field and smaller in a direction parallel to the magnetic field. For example, when it is desired to produce a molded article having a size of 10 mm by 10 mm, as shown in FIG. 1, if the shrinkage ratio in a direction parallel to a magnetic field is 0.3%, and the shrinkage ratio in a direction vertical to the magnetic field is 0.9%, a mold whose dimension in a direction parallel to the magnetic field is 10/(1−0.003)=10.03 mm, and whose dimension in a direction vertical to the magnetic field is 10/(1−0.009)=10.09 mm may be prepared and used to produce a perfect square molded article.

Figure 2:
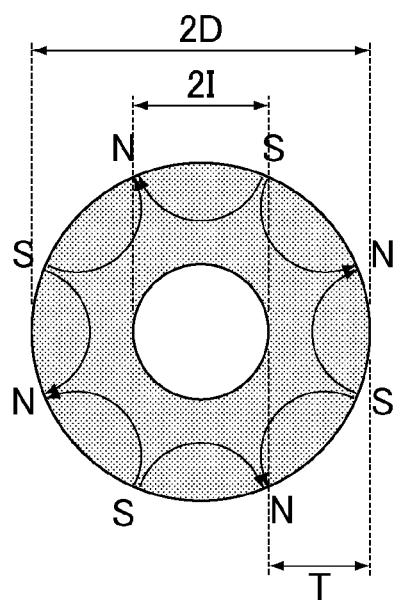
FIG. 2 is a schematic diagram that shows the magnetic pole portions and portions between magnetic poles of a polar anisotropic ring-shaped bonded magnet molded article.
Figure 3:
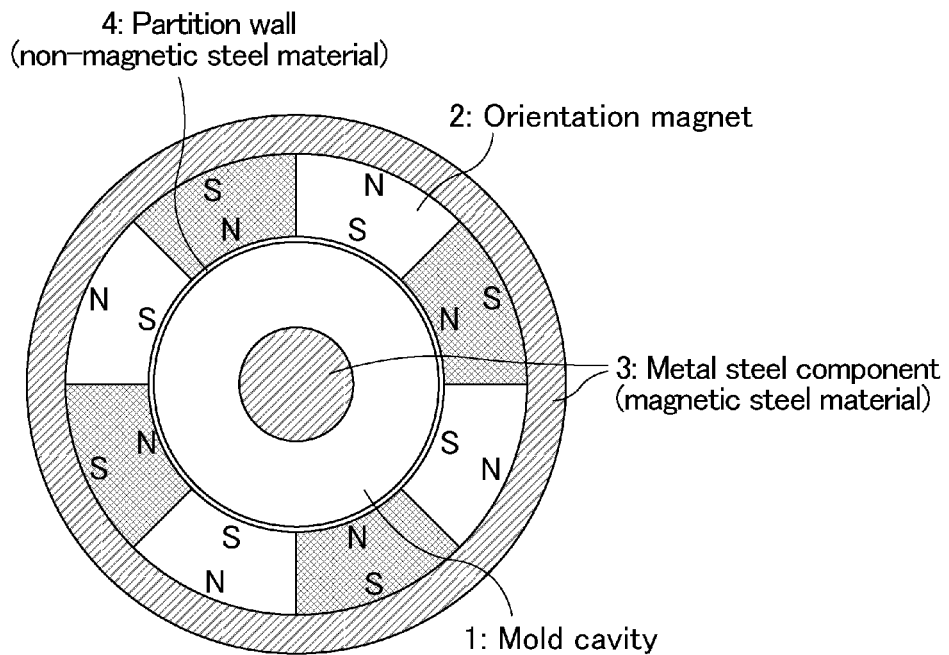
FIG. 3 is a schematic diagram of a mold for a polar anisotropic ring-shaped bonded magnet molded article as viewed in a filling direction of a bonded magnet resin composition.
Figure 4:
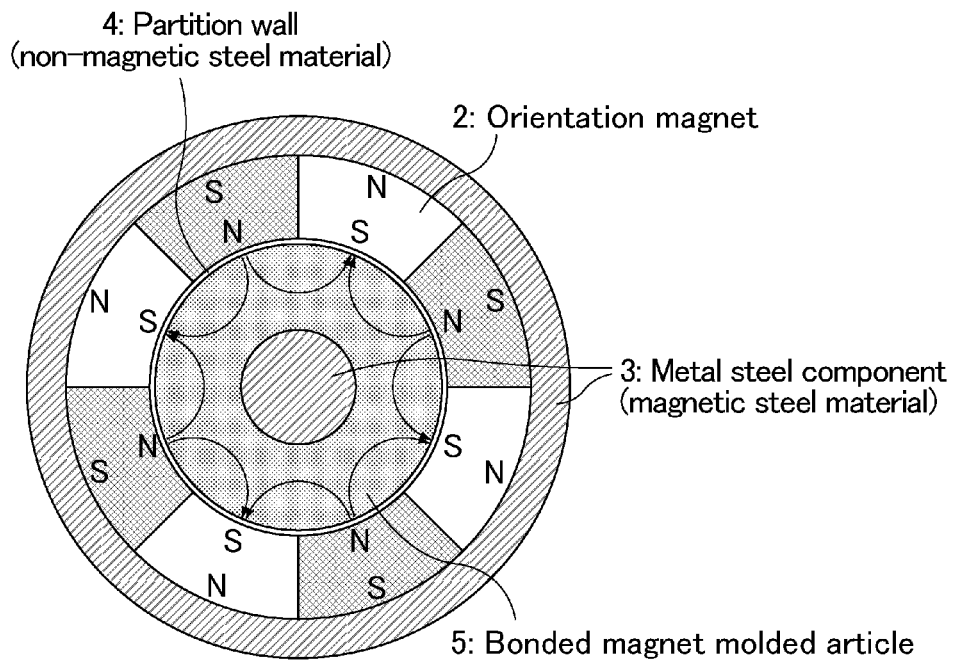
FIG. 4 is a schematic diagram that shows a mold for a polar anisotropic ring-shaped bonded magnet molded article and a molded article produced in the mold, as viewed in a filling direction of a bonded magnet resin composition.

However, unlike the case of such square molded articles, the production of ring-shaped bonded magnet molded articles involves complex factors. FIG. 2 shows a top view of a polar anisotropic ring-shaped bonded magnet molded article having an outer diameter 2D, an inner diameter 2I, a wall thickness T (=D−I), and a number of magnetic poles P of 8. The arrows in FIG. 2 indicate magnetic field directions. Such a molded article may be produced by injection molding using a mold in which orientation magnets are disposed as shown in FIG. 3. Its magnetic pole portions where a magnetic pole (N or S pole) is present show small magnetic field-induced shrinkage, while its portions between magnetic poles where no magnetic pole is present show great magnetic field-induced shrinkage. Thus, in this case, there will be 8 portions with great shrinkage and 8 portions with small shrinkage. When the outer peripheral shape of the mold cavity, i.e., the shape of the inside of the partition wall 4 to be in contact with a bonded magnet composition during molding as shown in FIG. 3, is defined by taking into account such magnetic field-induced shrinkage to increase the radius of the portions between magnetic poles, which will shrink to a great extent, and reduce the radius of the magnetic pole portions, which will shrink to a small extent, the prepared mold enables the production of a bonded magnet molded article with a high degree of roundness. FIG. 4 shows the mold filled with an injected bonded magnet composition.

As to the shape of the polar anisotropic ring-shaped bonded magnet molded article, the outer radius D is not particularly limited, but is preferably 10 mm or greater and 80 mm or less, more preferably 20 mm or greater and 50 mm or less, in order to facilitate filling of the mold with the bonded magnet composition by fluidity of the bonded magnet composition during injection molding. Moreover, the inner radius I of the molded article is defined by the outer radius D and the wall thickness T.

The wall thickness T of the molded article is not particularly limited, but is preferably 2 mm or greater and 10 mm or less, more preferably 4 mm or greater and 8 mm or less, in order to facilitate production of a bonded magnet with sufficiently satisfactory orientation, remanence, and sinusoidal magnetic flux density. Also, the wall thickness T is preferably at least ½ of the length of the magnetic pole pitch (the distance between magnetic poles). When the wall thickness T is at least ½ of the length of the magnetic pole pitch, geometric semicircular lines of magnetic force fall within the bonded magnet, and thus the drop in magnetic force due to magnetic path breaks can be reduced.

The height of the molded article in a direction vertical to the wall thickness is not particularly limited, but is preferably 5 mm or greater and 30 mm or less, more preferably 10 mm or greater and 20 mm or less, in order to facilitate filling of the mold with the bonded magnet composition by fluidity of the bonded magnet composition during injection molding.

Step 1)

Step 1) includes determining the shrinkage length (Tc) of a desired polar anisotropic ring-shaped bonded magnet molded article using the following equation:

$$Tc = T \times (\alpha 1/100 - \alpha 2/100)$$

wherein $\alpha 1$ represents the shrinkage ratio of a molded specimen in a direction vertical to a magnetic field, $\alpha 2$ represents the shrinkage ratio of the molded specimen in a direction parallel to the magnetic field, and T represents the wall thickness (=D−I) of the molded article. The shrinkage length Tc refers to the difference in shrinkage between the magnetic pole portions and the portions between magnetic poles. The shrinkage ratios $\alpha 1(\%)$ and $\alpha 2(\%)$ in directions vertical and parallel, respectively, to a magnetic field to be used in the calculation may be determined from the dimensions of a mold and the dimensions of a molded specimen prepared by molding a bonded magnet molded article composition at a similar injection molding temperature while applying the magnetic field to be applied during the actual molding in the mold. It is sufficient to use a resin composition that is substantially the same as the bonded magnet molded article composition to be actually molded in the mold. The substantially the same composition means that it includes the same matrix resin and the same magnetic material, and the magnetic material is present in a similar amount. As to other components such as optional components which are incorporated in small amounts that do not largely affect the shrinkage ratios, the composition does not necessarily have to contain the same components in the same amounts. The molded specimen used to measure the shrinkage ratios may have any shape such as a prismatic, cylindrical, spherical, or ring shape as long as the shrinkage ratios in directions vertical and parallel to the orientation magnetic field can be measured. Also, there is no problem as long as the magnetic field strength applied is similar to the magnetic field strength to be applied during the actual molding in the mold.

Step 2)

Step 2) includes determining the radius (Dm) of the magnetic pole portion of the mold cavity using the following equation:

$$Dm=D/(-\alpha2/100)$$

wherein α2 represents the shrinkage ratio of the molded specimen in the direction parallel to the magnetic field, and D represents the outer radius of the molded article.

Step 3)

Step 3) includes defining the outer peripheral shape of the mold cavity using the Tc, the Dm, and the number (P) of magnetic poles of the molded article. The outer peripheral shape of the mold cavity may refer to the peripheral shape of the inside of the partition wall 4 to be in contact with a composition during injection molding in a mold as shown in FIG. 3.

The definition of the outer peripheral shape of the mold cavity may be carried out by any method, such as using polar coordinates (r,θ) or rectangular coordinates (x,y).

When the outer peripheral shape is defined using polar coordinates (r,θ), with the origin at the center of the mold cavity, the radius r extending to the outer periphery is given by the following equation:

$$r=(Dm+\beta\times Tc/2)+(\beta\times Tc/2)\sin(P\theta)$$

wherein β represents a correction factor and 0.7≤β≤1.0. In the equation, Dm corresponds to the radius of the magnetic pole portion, and (Dm+β×Tc/2) corresponds to the radius of the portion between magnetic poles. The outer peripheral shape is defined in polar coordinates by adding the variation radius (β×Tc/2)sin(Pθ), which varies periodically depending on the number of magnetic poles (P), to the radius of the portion between magnetic poles (Dm+β×Tc/2).

The correction factor β is 0.7 or greater and 1.0 or less, and is preferably 0.9 or greater. A value of β of 1.0 corresponds to the case where magnetic field-induced shrinkage is fully taken into account. It is appreciated that the dimensional tolerance of molded articles is generally ±0.05 mm. More strictly, if the tolerance is set to one-half of that value, there is no problem as long as β is 0.7 or greater. The number of magnetic poles P may be any integer of 2 or greater and is preferably 2 or greater and 12 or less in view of orientation of the bonded magnet.

When the outer peripheral shape of the mold cavity is defined using rectangular coordinates (x,y), with the origin at the center of the mold cavity, the outer periphery is expressed in rectangular coordinates (x,y) by the following equations:

$$x=\{(Dm+\beta\times Tc/2)+(\beta\times Tc/2)\sin(P\theta)\}\times\cos\theta,\text{ and}$$

$$y=\{(Dm+\beta\times Tc/2)+(\beta\times Tc/2)\sin(P\theta)\}\times\sin\theta$$

wherein β represents a correction factor and 0.7≤β≤1.0, and 0≤θ≤2π. The correction factor β is 0.7 or greater and 1.0 or less, and is preferably 0.9 or greater. The detailed description of β is given as above.

A mold for a polar anisotropic ring-shaped bonded magnet molded article of a present embodiment has a cavity whose outer periphery is defined by the following equation in polar coordinates (r,θ), with the origin at the center of the mold cavity:

$$r=(Dm+\beta\times Tc/2)+(\beta\times Tc/2)\sin(P\theta)$$

wherein α1 represents the shrinkage ratio of a molded specimen in a direction vertical to a magnetic field; α2 represents the shrinkage ratio of the molded specimen in a direction parallel to the magnetic field; T represents the wall thickness of a desired polar anisotropic ring-shaped bonded magnet molded article; P represents the number of magnetic poles of the molded article; D represents the outer radius of the molded article; Tc represents the shrinkage length of the molded article as defined by T×(α1/100−α2/100); Dm represents the radius of the magnetic pole portion of the mold cavity as defined by D/(1−α2/100); and β represents a correction factor and 0.7≤β≤1.0. The equations, variables, constants, and other items are as described above.

A mold for a polar anisotropic ring-shaped bonded magnet molded article of a present embodiment has a cavity whose outer periphery is defined by the following equations in rectangular coordinates (x,y), with the origin at the center of the mold cavity:

$$x=\{(Dm+\beta\times Tc/2)+(\beta\times Tc/2)\sin(P\theta)\}\times\cos\theta,\text{ and}$$

$$y=\{(Dm+\beta\times Tc/2)+(\beta\times Tc/2)\sin(P\theta)\}\times\sin\theta$$

wherein α1 represents the shrinkage ratio of a molded specimen in a direction vertical to a magnetic field; α2 represents the shrinkage ratio of the molded specimen in a direction parallel to the magnetic field; T represents the wall thickness of a desired polar anisotropic ring-shaped bonded magnet molded article; P represents the number of magnetic poles of the molded article; D represents the outer radius of the molded article; Tc represents the shrinkage length of the molded article as defined by T×(α1/100−α2/100); Dm represents the radius of the magnetic pole portion of the mold cavity as defined by D/(1−α2/100); β represents a correction factor and 0.7≤β≤1.0; and 0≤θ≤2π. The equations, variables, constants, and other items are as described above.

FIG. 3 is a schematic diagram of the mold for a polar anisotropic ring-shaped bonded magnet molded article of the present embodiment as viewed in a filling direction of a bonded magnet resin composition. The mold includes a cavity enclosed by metal steel components 3 made of a magnetic steel material; orientation magnets 2, and a partition wall 4 defining an outer peripheral shape that is determined as described above, and the orientation magnets and partition wall are disposed in the cavity. A bonded magnet composition may be injected into a mold cavity 1 defined by the central metal steel component 3 and the partition wall 4 to give a shape.

The metal steel components 3 are preferably made of a magnetic steel material. Examples of the magnetic steel material include pre-hardened steel, quenched steel, and carbon steel. However, the partition wall 4 is preferably made of a non-magnetic steel material. Examples of the non-magnetic steel material include aluminum alloy, stainless steel, and ageing steel. The orientation magnets 2 are preferably made of a magnetic material. Examples of the magnetic material include NdFeB and SmCo sintered magnets. NdFeB sintered magnets are preferred in view of orientation magnetic field strength.

Moreover, a method of producing a polar anisotropic ring-shaped bonded magnet molded article of a present embodiment may include injection molding a bonded magnet composition in the mold for a polar anisotropic ring-shaped bonded magnet molded article.

The bonded magnet composition used may contain a thermoplastic resin and a magnetic powder.

The magnetic powder used in the present embodiment may include, but not limited to, a SmFeN, NdFeB, or SmCo rare earth magnetic powder. The rare earth magnetic powder is more preferably a SmFeN magnetic powder which is superior in heat resistance to NdFeB and has the advantage over SmCo of being free from rare metals. The SmFeN magnetic powder may be a nitride having a $Th_2Zn_{17}$-type crystal structure and containing the rare earth metal Sm, iron (Fe), and nitrogen (N) as represented by the formula: $Sm_xFe_{100-x-y}N_y$ wherein the value "x" indicating the atomic percent (%) of the rare earth metal Sm is in the range of 8.1 to 10 (at %); the value "y" indicating the atomic percent (%) of N is in the range of 13.5 to 13.9 (at %); and the balance is mainly Fe. Moreover, the magnetic powder may be a combination of a SmFeN magnetic powder with a NdFeB or SmCo rare earth magnetic powder or a ferrite magnetic powder.

The SmFeN magnetic powder may be produced as described in JP 3698538 B, for example. The thus produced SmFeN magnetic powder may suitably have an average particle size of 2 to 5 µm with a standard deviation of 1.5 µm or less.

The NdFeB magnetic powder may be produced by an HDDR process as described in JP 3565513 B, for example. The thus produced NdFeB magnetic powder may suitably have an average particle size of 40 to 200 µm and a maximum energy product of 34 to 42 MGOe (270 to 335 kJ/m³). The SmCo magnetic powder may be produced as described in JP 3505261 B, for example. The thus produced magnetic powder may have an average particle size of 10 to 30 µm.

Examples of the thermoplastic resin include, but not limited to, polypropylene, polyethylene, polyvinyl chloride, polyester, polyamide, polycarbonate, polyphenylene sulfide, and acrylic resins. Among these, polyamide resins are preferred, and polyamide 12 is particularly preferred. Polyamide 12 is a crystalline resin having a relatively low melting point and a low water absorption rate and thus shows good moldability. Moreover, these resins may be used in admixture as appropriate.

The amount of the thermoplastic resin is not particularly limited, but is preferably 3 parts by mass or greater and 20 parts by mass or less, more preferably 5 parts by mass or greater and 15 parts by mass or less, per 100 parts by mass of the magnetic powder. An amount greater than 20 parts by mass tends to lead to lower magnetic force, while an amount of less than 3 parts by mass tends to result in insufficient fluidity during injection molding.

The bonded magnet composition may contain a thermoplastic elastomer and/or an antioxidant.

Examples of the thermoplastic elastomer include polystyrene, polyolefin, polyester, polyurethane, and polyamide thermoplastic elastomers. With a thermoplastic elastomer, initial strength may be improved without impairing fluidity. Moreover, these thermoplastic elastomers may be used in admixture as appropriate. Among these, polyamide thermoplastic elastomers having good chemical resistance are preferred.

Examples of the antioxidant include phosphorus and phenolic antioxidants. With a phosphorus antioxidant, changes in strength of the composite component over time may be reduced even under high temperature conditions. Examples of the phosphorus antioxidants include tris(2,4-di-tert-butylphenyl)phosphite.

The injection molding conditions and other factors are not particularly limited, and conditions usually used for injection molding bonded magnet compositions may be used without modification.

EXAMPLES

Examples are described below. It should be noted that "%" is by mass unless otherwise specified.

Preparation Example

Preparation of Bonded Magnet Composition

An amount of 91.96% by mass of a samarium/iron/nitrogen magnetic powder (average particle size: 3 µm) was mixed with 7.74% by mass of a 12 nylon resin powder and 0.3% by mass of a phenolic antioxidant powder in a mixer. Then, the powder mixture was introduced and kneaded at 210° C. in a twin screw kneader to obtain a kneaded mixture. The kneaded mixture was cooled and then cut into an appropriate size to obtain a bonded magnet composition.

Example

The composition was injection molded at 250° C. into a mold for producing a molded specimen having a size of 10 mm in diameter by 7 mm while applying a magnetic field of 716 kA/m, and then measured for shrinkage ratio. The composition had a shrinkage ratio in a direction parallel to the magnetic field ($\alpha 2$) of 0.3% and a shrinkage ratio in a direction vertical to the magnetic field ($\alpha 1$) of 1.0%.

The shrinkage ratios $\alpha 1$ and $\alpha 2$ were used to prepare a partition wall internally defining an outer peripheral shape in which the radius r extending to the outer periphery was defined by the following equation in polar coordinates (r,θ), with the origin at the center of the mold cavity:

$$r=(Dm+\beta \times Tc/2)+(\beta \times Tc/2)\sin(P\theta)$$

wherein β=1.0, in order to produce a polar anisotropic ring-shaped bonded magnet molded article having an outer diameter 2D of 50 mm, an inner diameter 2I of 40 mm, a wall thickness T of 5 mm, a height in a direction vertical to the wall thickness of 10 mm, and a number of magnetic poles of 8. Tc was 0.035 mm, and Dm was 25.075 mm.

The partition wall and eight orientation magnets were placed in a mold to prepare a mold for the polar anisotropic ring-shaped bonded magnet molded article. The bonded magnet composition prepared in the preparation example was injection molded in the mold at an injection molding temperature of 250° C. and a mold temperature of 90° C. to produce ten molded articles, which were then measured for roundness using a measurement microscope (model number MF-A1010, Mitutoyo Corporation). The molded articles had a roundness of 10 µm, indicating that polar anisotropic ring-shaped bonded magnet molded articles with a high degree of roundness were produced.

With the method of preparing a mold for a polar anisotropic ring-shaped bonded magnet molded article of the present invention, it is possible to prepare molds for polar anisotropic ring-shaped bonded magnet molded articles which enable the production of bonded magnet molded articles with a high degree of roundness. Thus, the method of the present invention eliminates the need for mold modification and preparation of a test mold and is of very high industrial value.

What is claimed is:

1. A method of preparing a mold for a polar anisotropic ring-shaped bonded magnet molded article, the method comprising:

1) determining a shrinkage length (Tc) of a desired polar anisotropic ring-shaped bonded magnet molded article using the following equation:

$$Tc = T \times (\alpha 1/100 - \alpha 2/100)$$

wherein α1 represents a shrinkage ratio of a molded specimen in a direction vertical to a magnetic field, α2 represents a shrinkage ratio of the molded specimen in a direction parallel to the magnetic field, and T represents a wall thickness of the molded article;

2) determining a radius (Dm) of a magnetic pole portion of a mold cavity using the following equation:

$$Dm = D/(1-\alpha 2/100)$$

wherein α2 represents the shrinkage ratio of the molded specimen in the direction parallel to the magnetic field, and D represents an outer radius of the molded article;

3) preparing a partition wall based on the shrinkage ratios α1 and α2;
4) placing the partition wall in the mold; and
5) defining an outer peripheral shape of the mold cavity based on the partition wall using the Tc, the Dm, a correction factor, and a number (P) of magnetic poles of the molded article.

2. The method according to claim 1,
wherein the method comprises as 5) defining the outer peripheral shape of the mold cavity by the following equation in polar coordinates (r,θ) of a cavity outer periphery, with an origin at a center of the mold cavity:

$$r = (Dm + \beta \times Tc/2) + (\beta \times Tc/2)\sin(P\theta)$$

wherein β represents the correction factor and 0.7≤β≤1.0.

3. The method according to claim 2,
wherein the method comprises as 5) defining the outer peripheral shape of the mold cavity by the following equations in rectangular coordinates (x,y) of a cavity outer periphery, with the origin at the center of the mold cavity:

$$x = \{(Dm + \beta \times Tc/2) + (\beta \times Tc/2)\sin(P\theta)\} \times \cos\theta, \text{ and}$$

$$y = \{(Dm + \beta \times Tc/2) + (\beta \times Tc/2)\sin(P\theta)\} \times \sin\theta$$

wherein β represents a correction factor and 0.7≤β≤1.0, and 0≤θ≤2π.

4. The method according to claim 1,
wherein the method comprises as 5) defining the outer peripheral shape of the mold cavity by the following equation in rectangular coordinates (x,y) of a cavity outer periphery, with an origin at a center of the mold cavity:

$$x = \{(Dm + \beta \times Tc/2) + (\beta \times Tc/2)\sin(P\theta)\} \times \cos\theta, \text{ and}$$

$$y = \{(Dm + \beta \times Tc/2) + (\beta \times Tc/2)\sin(P\theta)\} \times \sin\theta$$

wherein β represents a correction factor and 0.7≤β≤1.0, and 0≤θ≤2π.

5. A method of producing a polar anisotropic ring-shaped bonded magnet molded article, the method comprising
preparing a mold for a polar anisotropic ring-shaped bonded magnet molded article according to claim 1, and
injection molding a bonded magnet composition in the mold.

6. A method of producing a polar anisotropic ring-shaped bonded magnet molded article, the method comprising
preparing a mold for a polar anisotropic ring-shaped bonded magnet molded article according to claim 2, and
injection molding a bonded magnet composition in the mold.

7. A method of producing a polar anisotropic ring-shaped bonded magnet molded article, the method comprising
preparing a mold for a polar anisotropic ring-shaped bonded magnet molded article according to claim 3, and
injection molding a bonded magnet composition in the mold.

8. A method of producing a polar ring-shaped bonded magnet molded article, the method comprising:
1) Determining a shrinkage length (Tc) of a desired polar anisotropic ring-shaped bonded magnet molded article using the following equation:

$$Tc = T \times (\alpha 1/100 - \alpha 2/100)$$

wherein α1 represents a shrinkage ratio of a molded specimen in a direction vertical to a magnetic field, α2 represents a shrinkage ratio of the molded specimen in a direction parallel to the magnetic field, and T represents a wall thickness of the molded article;

2) determining a radius (Dm) of a magnetic pole portion of a mold cavity using the following equation:

$$Dm = D/(1-\alpha 2/100)$$

wherein α2 represents the shrinkage ratio of the molded specimen in the direction parallel to the magnetic field, and D represents an outer radius of the molded article;

3) defining an outer peripheral shape of the mold cavity using the Tc, the Dm, and a number (P) of magnetic poles of the molded article, wherein 3) defining the outer peripheral shape of the mold cavity by the following equation in polar coordinates (r,θ) of a cavity outer periphery, with an origin at a center of the mold cavity:

$$r = (Dm + \beta \times Tc/2) + (\beta \times Tc/2)\sin(P\theta)$$

wherein α2 represents a correction factor and 0.7≤β≤1.0;
4) Preparing a mold for the polar anisotropic ring-shaped bonded magnet molded article based on the defined outer peripheral shape of the mold cavity; and
5) injection molding a bonded magnet composition in the mold.

9. The method according to claim 8,
wherein the method comprises as 3) defining the outer peripheral shape of the mold cavity by the following equations in rectangular coordinates (x,y) of a cavity outer periphery, with the origin at the center of the mold cavity:

$$x = \{(Dm + \beta \times Tc/2) + (\beta \times Tc/2)\sin(P\theta)\} \times \cos\theta, \text{ and}$$

$$y = \{(Dm + \beta \times Tc/2) + (\beta \times Tc/2)\sin(P\theta)\} \times \sin\theta$$

wherein β represents a correction factor and 0.7≤β≤1.0, and 0≤θ≤2π.

10. A method of producing a polar ring-shaped bonded magnet molded article, the method comprising:
1) Determining a shrinkage length (Tc) of a desired polar anisotropic ring-shaped bonded magnet molded article using the following equation:

$$Tc = T \times (\alpha 1/100 - \alpha 2/100)$$

wherein α1 represents a shrinkage ratio of a molded specimen in a direction vertical to a magnetic field, α2 represents a shrinkage ratio of the molded specimen in a direction parallel to the magnetic field, and T represents a wall thickness of the molded article;

2) Determining a radius (Dm) of a magnetic pole portion of a mold cavity using the following equation:

$$Dm = D/(1 - \alpha 2/100)$$

wherein α2 represents the shrinkage ratio of the molded specimen in the direction parallel to the magnetic field, and D represents an outer radius of the molded article;

3) Defining an outer peripheral shape of the mold cavity using the Tc, the Dm, and a number (P) of magnetic poles of the molded article, wherein the method comprises as 3) defining the outer peripheral shape of the mold cavity by the following equations in rectangular coordinates (x,y) of a cavity outer periphery, with an origin at a center of the mold cavity:

$$x = \{(Dm + \beta \times Tc/2) + (\beta \times Tc/2)\sin(P\theta)\} \times \cos\theta, \text{ and}$$

$$y = \{(Dm + \beta \times Tc/2) + (\beta \times Tc/2)\sin(P\theta)\} \times \sin\theta$$

wherein β represents a correction factor and $0.7 \leq \beta \leq 1.0$, and $0 \leq \theta \leq 2\pi$;

4) Preparing a mold for the polar anisotropic ring-shaped bonded magnet molded article based on the defined outer peripheral shape of the mold cavity; and 5) injection molding a bonded magnet composition in the mold.

* * * * *